US010336925B2

(12) United States Patent
Bae et al.

(10) Patent No.: US 10,336,925 B2
(45) Date of Patent: Jul. 2, 2019

(54) POLYESTER POLYOLS FOR REACTIVE HOT-MELT ADHESIVES

(71) Applicant: Resinate Materials Group, Inc., Plymouth, MI (US)

(72) Inventors: Woo-Sung Bae, Northville, MI (US); Kevin Rogers, Farmington, MI (US); Michael Christy, Howell, MI (US); Rick Tabor, Plymouth, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 85 days.

(21) Appl. No.: 15/257,411

(22) Filed: Sep. 6, 2016

(65) Prior Publication Data

US 2017/0066950 A1 Mar. 9, 2017

Related U.S. Application Data

(63) Continuation of application No. PCT/US2016/049190, filed on Aug. 29, 2016.

(60) Provisional application No. 62/215,246, filed on Sep. 8, 2015.

(51) Int. Cl.
| | |
|---|---|
| *C09J 175/06* | (2006.01) |
| *C09J 7/35* | (2018.01) |
| *C09J 7/22* | (2018.01) |
| *C09J 169/00* | (2006.01) |
| *C08G 18/10* | (2006.01) |
| *C08G 63/16* | (2006.01) |
| *C08G 63/183* | (2006.01) |
| *C08G 63/64* | (2006.01) |
| *C08G 18/44* | (2006.01) |
| *C08G 63/42* | (2006.01) |
| *C08G 18/76* | (2006.01) |
| *C08G 18/42* | (2006.01) |

(52) U.S. Cl.
CPC ........... *C09J 175/06* (2013.01); *C08G 18/10* (2013.01); *C08G 18/4216* (2013.01); *C08G 18/44* (2013.01); *C08G 18/7671* (2013.01); *C08G 63/16* (2013.01); *C08G 63/183* (2013.01); *C08G 63/42* (2013.01); *C08G 63/64* (2013.01); *C09J 7/22* (2018.01); *C09J 7/35* (2018.01); *C09J 169/00* (2013.01); *C08G 2170/20* (2013.01); *C09J 2400/163* (2013.01); *C09J 2423/006* (2013.01); *C09J 2427/006* (2013.01); *C09J 2469/00* (2013.01); *C09J 2469/006* (2013.01); *C09J 2475/00* (2013.01); *Y02P 20/582* (2015.11)

(58) Field of Classification Search
None
See application file for complete search history.

(56) References Cited

U.S. PATENT DOCUMENTS

| | | | |
|---|---|---|---|
| 3,647,759 A | 3/1972 | Walker | |
| 3,804,810 A | 4/1974 | Fryd | |
| 4,411,949 A | 10/1983 | Snider et al. | |
| 4,503,189 A * | 3/1985 | Igarashi | C08G 18/10 525/104 |
| 4,714,717 A | 12/1987 | Londrigan et al. | |
| 4,897,429 A | 1/1990 | Trowell et al. | |
| 5,075,417 A | 12/1991 | Trowell et al. | |
| 5,599,895 A | 2/1997 | Heider | |
| 5,889,126 A * | 3/1999 | Kaplan | C08G 63/6854 524/714 |
| 6,448,193 B1 | 9/2002 | Miskovic et al. | |
| 6,635,721 B1 * | 10/2003 | Moens | C09D 167/00 427/385.5 |
| 7,070,051 B2 * | 7/2006 | Kanner | A61B 17/06133 206/382 |
| 7,641,968 B2 | 1/2010 | Kanagawa et al. | |
| 8,334,035 B2 | 12/2012 | Nefzger et al. | |
| 2003/0212235 A1 | 11/2003 | Nowicki et al. | |
| 2007/0129523 A1 | 6/2007 | Ichihashi et al. | |
| 2009/0131625 A1 | 5/2009 | Kurian et al. | |

(Continued)

FOREIGN PATENT DOCUMENTS

| | | |
|---|---|---|
| EP | 0034919 A2 | 9/1981 |
| EP | 0248570 A1 | 12/1987 |

(Continued)

OTHER PUBLICATIONS

Paszun, D. et al., Ind. Eng. Chem. Res. 36 (1997) 1373.
Ikladious, N., J. Elast. Plast. 32 (2000) 140.
Troev, K. et al., J. Appl. Polym. Sci. 90 (2003) 1148.
PCT International Search Report and Written Opinion dated Nov. 3, 2016 in corresponding Application No. PCT/US2016/049190, 10 pages.

Primary Examiner — Frank D Ducheneaux
(74) Attorney, Agent, or Firm — Dilworth IP, LLC

(57) ABSTRACT

Semi-crystalline polyester polyols and their use in reactive hot-melt adhesives are disclosed. The polyols comprise recurring units of a $C_2$-$C_{10}$ aliphatic diol, a $C_8$-$C_{24}$ aliphatic dicarboxylic acid, and 1 to 20 wt. % of an aromatic dicarboxylic acid source, a polycarbonate, or a combination thereof. The polyols have a hydroxyl number within the range of 14 to 112 mg KOH/g. Reactive hot-melt adhesives from the polyols and composite structures produced using the adhesives are also disclosed. A minor proportion of aromatic dicarboxylic acid, polycarbonate content in the polyester polyol surprisingly improves the properties of reactive hot-melt adhesives when compared with a commercial hot-melt adhesive or an adhesive formulated using an all-aliphatic polyester polyol. The adhesives are useful for bonding a wide variety of substrates, including paper, wood, glass, ceramics, plastics, and metals.

20 Claims, No Drawings

(56) References Cited

U.S. PATENT DOCUMENTS

| | | | |
|---|---|---|---|
| 2010/0021740 A1* | 1/2010 | Tanaka | B32B 9/02 |
| | | | 428/412 |
| 2010/0104831 A1 | 4/2010 | Kanagawa et al. | |
| 2010/0126664 A1 | 5/2010 | O'Brien | |
| 2016/0032045 A1* | 2/2016 | Diehl | C08G 18/7671 |
| | | | 524/603 |
| 2018/0186919 A1* | 7/2018 | Zupancic | B32B 7/12 |

FOREIGN PATENT DOCUMENTS

| | | | |
|---|---|---|---|
| EP | 0611146 A2 | 8/1994 | |
| WO | 96/07687 A1 | 3/1996 | |
| WO | 99/54380 A1 | 10/1999 | |
| WO | 01/40343 A1 | 6/2001 | |
| WO | 2004/083274 A1 | 9/2004 | |
| WO | 2013/138350 A1 | 9/2013 | |
| WO | 2014/114758 A1 | 7/2014 | |
| WO | WO 2014/139858 A1 * | 9/2014 | C09D 175/04 |

\* cited by examiner

POLYESTER POLYOLS FOR REACTIVE HOT-MELT ADHESIVES

FIELD OF THE INVENTION

The invention relates to polyester polyols and reactive hot-melt polyurethane adhesives made from the polyols.

BACKGROUND OF THE INVENTION

Most reactive hot-melt adhesives are high-solids, thermoplastic prepolymers having free isocyanate (NCO) contents from 1 to 5 wt. %. The prepolymers set quickly upon cooling as the prepolymer crystallizes, thereby providing good green strength. Ultimate tensile and adhesive properties are achieved as the isocyanate groups in the prepolymer react with atmospheric moisture over 1 to 7 days to provide a fully cured, thermoset adhesive. Reactive hot-melt adhesives work most effectively with porous substrates that more readily allow moisture to diffuse into the prepolymer to accomplish a cure. For some examples of reactive hot-melt adhesives, see U.S. Pat. Nos. 7,641,968 and 6,448,193 and PCT Internat. Publ. No. WO 2014/114758.

Aliphatic polyester polyols, especially those having a high degree of crystallinity, are commonly used for reactive hot-melt adhesives (see, e.g., PCT Internat. Publ. No. WO 01/40343, U.S. Publ. No. 2003/0212235, and U.S. Pat. No. 5,599,895).

Polyester polyols made from combinations of aliphatic and aromatic diacids have been described in a variety of contexts. Most of these have a relatively high proportion of the aromatic diacid (see, e.g., EP 0034919; EP 0248570; U.S. Pat. Nos. 3,804,810 and 8,334,035; and U.S. Publ. Nos. 2007/0129523 and 2010/0126664). Occasionally, scrap PET is described as the source of the aromatic diacid for making the mixed aromatic/aliphatic polyester polyol (see, e.g., EP 0248570). In some cases, the mixed aromatic/aliphatic systems are used to produce moisture-cured, hot-melt polyurethane adhesives from NCO-terminated prepolymers (see, e.g., U.S. Publ. Nos. 2010/0126664, 2010/0104831 and 2007/0129523; PCT Internat. Publ. No. WO 2014/114758; and U.S. Pat. No. 7,641,968).

Polycarbonates, such as bisphenol A polycarbonate, can be recycled. Usually, scrap polycarbonate is pulverized and melt extruded to produce polycarbonate thermoplastics. Recycled polycarbonates have apparently not been used as a raw material to modify aliphatic polyester polyols or to use such polyols to make reactive hot-melt polyurethane adhesives.

A continuing issue for reactive hot-melt adhesives is how to produce adhesives with adequate green strength and good ultimate adhesion to a variety of common substrates. Adhesion to polyolefins (e.g., polyethylene or polypropylene) is particularly challenging due to the nonpolar nature of these substrates.

Improved polyols are needed. In particular, the urethane industry needs sustainable polyols based in substantial part on recycled polymers such as polycarbonates and the practically unlimited supply of recycled polyethylene terephthalate. Polyols with high recycle content that satisfy the demanding viscosity, functionality, hydroxyl content, and other requirements of polyurethane formulators would be valuable. Of particular interest are polyols that can provide hot-melt polyurethane adhesives with good green strength and good ultimate adhesive strength when applied to paper, wood, plastic, glass, ceramic, or metal substrates.

SUMMARY OF THE INVENTION

In one aspect, the invention relates to semi-crystalline polyester polyols and their use in reactive hot-melt adhesives. The polyester polyols comprise recurring units of a $C_2$-$C_{10}$ aliphatic diol, a $C_8$-$C_{24}$ aliphatic dicarboxylic acid, and an aromatic dicarboxylic acid source, a polycarbonate, or a combination thereof. From 1 to 20 wt. % of the aromatic dicarboxylic acid source or polycarbonate is used based on the combined amounts of aliphatic dicarboxylic acid and the aromatic dicarboxylic acid source or polycarbonate. Additionally, the polyols have a hydroxyl number within the range of 14 to 112 mg KOH/g.

The invention includes a reactive hot-melt adhesive comprising a reaction product of a polyisocyanate and the semi-crystalline polyester polyol described above wherein, prior to curing, the adhesive has a free NCO content within the range of 0.5 to 8.0 wt. %.

The invention also includes composite structures comprising a wood, paper, glass, ceramic, plastic, or metal substrate and a cured hot-melt adhesive as described above that is bonded to at least one surface of the substrate.

We surprisingly found that a minor proportion of aromatic dicarboxylic acid or polycarbonate content in the polyester polyol can improve properties of reactive hot-melt adhesives when compared with a commercial hot-melt adhesive or an adhesive formulated using an all-aliphatic polyester polyol. Reactive hot-melt adhesives of the invention are useful for bonding a wide variety of substrates, including paper, wood, glass, ceramics, plastics, and metals.

DETAILED DESCRIPTION OF THE INVENTION

In one aspect, the invention relates to a semi-crystalline polyester polyol. The polyol comprises recurring units of a $C_2$-$C_{10}$ aliphatic diol, a $C_8$-$C_{24}$ aliphatic dicarboxylic acid, and an aromatic dicarboxylic acid source, polycarbonate, or a combination thereof.

Aliphatic Diol

Aliphatic $C_2$-$C_{10}$ diols suitable for use are well known. By "diol," we mean a linear or branched, aliphatic or cycloaliphatic compound or mixture of compounds having two hydroxyl groups. Other functionalities, particularly ether or ester groups, may be present in the diol. Suitable diols include, for example, ethylene glycol, propylene glycol, 1,3-propanediol, 1,2-butanediol, 1,3-butanediol, 1,4-butanediol, 2-methyl-1,3-propanediol, neopentyl glycol, 1,5-pentanediol, 2,2,4,4-tetramethyl-1,3-cyclobutanediol, 3-methyl-1,5-pentanediol, 1,4-cyclohexanedimethanol, 1,3-cyclohexanedimethanol, diethylene glycol, dipropylene glycol, triethylene glycol, 1,6-hexanediol, 1,8-octanediol, dipropylene glycol, tripropylene glycol, tetraethylene glycol, and the like, and mixtures thereof. In some aspects, the aliphatic diol is 1,3-propanediol, 1,4-butanediol, or a mixture thereof. In other aspects, the diol is a recycled glycol (e.g., recycled propylene glycol, diethylene glycol, or ethylene glycol), a bio-based diol (e.g., 1,3-propanediol), or a combination thereof.

Aliphatic Dicarboxylic Acid

The semi-crystalline polyester polyols further comprise recurring units of a $C_8$-$C_{24}$ aliphatic dicarboxylic acid, preferably a $C_8$-$C_{18}$ aliphatic dicarboxylic acid, and in some aspects, a saturated $C_8$-$C_{24}$ aliphatic dicarboxylic acid, preferably a saturated $C_8$-$C_{18}$ aliphatic dicarboxylic acid. Suitable $C_8$-$C_{24}$ aliphatic dicarboxylic acids include, for example, suberic acid, azelaic acid, sebacic acid, undecanedioic acid, dodecanedioic acid, tridecanedioic acid, tetradecanedioic acid, pentadecanedioic acid, hexadecanedioic acid, septadecanedioic acid, octadecanedioic acid, and the like, and mixtures thereof. Preferred $C_8$-$C_{24}$ aliphatic dicarboxylic acids are suberic acid, azelaic acid, sebacic acid, dodecanedioic acid, tetradecanedioic acid, hexadecanedioic acid, octadecanedioic acid, and mixtures thereof. In some aspects, the aliphatic dicarboxylic acid comprises at least 60 wt. % of azelaic acid.

Suitable $C_8$-$C_{24}$ aliphatic dicarboxylic acids are available commercially. These dicarboxylic acids are commonly mixtures of two or more dicarboxylic acids. For instance, suitable aliphatic dicarboxylic acids include products from Emery Oleochemicals such as Emerox® 1110, Emerox® 1112, and Emerox® 1175, which are mixtures of 70-80 wt. % azelaic acid with up to 20 wt. % of diacids having more than 9 carbons. Also suitable is Crodacid™ DC 1195 azelaic acid from Croda. Azelaic acid is a bio-renewable aliphatic $C_9$ dicarboxylic acid available from ozonolysis of oleic acid.

In some aspects, suitable unsaturated aliphatic dicarboxylic acids are available from metathesis chemistry. For instance, self-metathesis of methyl 10-undecenoate affords the dimethyl ester of 1,20-eicos-10-enoic acid, which can be hydrolyzed to give a $C_{20}$ monounsaturated dicarboxylic acid, and self-metathesis of methyl 9-decenoate gives the dimethyl ester of 1,18-octadec-9-enoic acid, which can be hydrolyzed to give a $C_{18}$ monounsaturated dicarboxylic acid.

Mixtures of various saturated and unsaturated aliphatic dicarboxylic acids can be used to achieve a desired melting range or degree of crystallinity. When the saturated dicarboxylic acid has a relatively high carbon number (e.g., 20 or greater), it may be desirable to combine it with a saturated dicarboxylic acid having fewer carbons or with an unsaturated dicarboxylic acid. Such mixtures may have a lower melting range or a lower degree of crystallinity, thereby providing more satisfactory performance in making reactive hot-melt adhesives or other products.

Aromatic Dicarboxylic Acid Source

In some aspects, the semi-crystalline polyester polyol comprises recurring units of an aromatic dicarboxylic acid source. Suitable aromatic dicarboxylic acid sources include aromatic dicarboxylic acids (e.g., phthalic acid, isophthalic acid, terephthalic acid, naphthalene dicarboxylic acids, furan dicarboxylic acids). Anhydrides (e.g., phthalic anhydride) and mono- or diesters of aromatic dicarboxylic acids (e.g., mono- or dimethyl terephthalate, and bis(hydroxyalkyl) terephthalates) are also suitable. Dimethyl terephthalate distillation residues ("DMT bottoms") as described, e.g. in U.S. Pat. Nos. 5,075,417; 4,897,429; 3,647,759; 4,411,949; 4,714,717; and 4,897,429, the teachings of which are incorporated herein by reference, can also be used as the aromatic dicarboxylic acid source. Oligomers comprising aromatic dicarboxylic acid recurring units, such as products made from incomplete digestion of polyethylene terephthalate with glycols, are also suitable aromatic dicarboxylic acid sources. The aromatic dicarboxylic acid source can be obtained from recycled polymers and waste streams. In fact, in view of green chemistry and sustainability considerations, it is highly desirable to use aromatic dicarboxylic acid sources from such recycled polymers and waste streams.

Thermoplastic polyesters, also suitable for use as the aromatic dicarboxylic acid source, are well known in the art. These are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); copolymers of 2,2,4,4-tetramethyl-1,3-cyclobutanediol with isophthalic acid, terephthalic acid or orthophthalic derivatives; polyethylene furanoate; and the like, and mixtures thereof. Further examples of thermoplastic polyesters are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters can be found in Chapters 18-20 of *Handbook of Thermoplastics*, O. Olabisi, ed., 1997, Marcel Dekker, Inc. New York. Suitable thermoplastic polyesters include virgin polyesters, recycled polyesters, or mixtures thereof.

In a preferred aspect, polyethylene terephthalate, especially recycled polyethylene terephthalate (rPET), virgin PET, recycled PTT, and mixtures thereof, is used as the aromatic dicarboxylic acid source. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. Another source of PET or PTT can be either post-industrial or post-consumer PTT or PET carpet. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

In some aspects, the polyester polyol comprises recurring units from a digested thermoplastic polyester. "Digested" refers to a reaction product generated by reacting the thermoplastic polyester with one or more glycols, optionally in the presence of a catalyst, under conditions effective to at least partially depolymerize the thermoplastic polyester to produce oligomeric materials.

In some aspects, the aromatic dicarboxylic acid source is recycled polyethylene terephthalate, the aliphatic dicarboxylic acid is azelaic acid, octadecanedioic acid, or a mixture thereof, and the aliphatic diol is 1,3-propanediol, 1,4-butanediol, or a mixture thereof.

Polycarbonate

In some aspects, the semi-crystalline polyester polyol comprises recurring units from a polycarbonate. The polycarbonate can be used instead of or in addition to the aromatic dicarboxylic acid source. Preferably, the polycarbonate is a recycled material, especially bisphenol A polycarbonate. Polycarbonates from other bisphenols can also be used. The polycarbonate can be made by reacting bisphenols with phosgene. However, the preferred source is scrap polycarbonate recovered from containers, compact discs, construction materials, automotive or aircraft parts, eyeglass lenses, safety goggles or shields, consumer electronics, or other sources. The polycarbonate can be melt extruded and cut into pellets or chopped or ground into a powder or granules. Although the form of polycarbonate is not critical, particles, pellets, or granules are generally easier to combine with the other reactants used to make the semi-crystalline polyester polyol.

The semi-crystalline polyester polyols comprise a relatively minor proportion of the aromatic dicarboxylic acid source, polycarbonate, or combination thereof. Thus, the polyols comprise from 1 to 20 wt. %, or 5 to 15 wt. %, or 5 to less than 10 wt. %, of the aromatic dicarboxylic acid source, polycarbonate, or combination thereof based on the combined amounts of aliphatic dicarboxylic acid and aromatic dicarboxylic acid source, polycarbonate, or combination thereof.

Methods for Making the Polyester Polyols

The polyester polyols can be made by any suitable method. In one method, the $C_2$-$C_{10}$ aliphatic diol, $C_8$-$C_{24}$ aliphatic dicarboxylic acid, and the aromatic dicarboxylic acid source and/or polycarbonate are simply combined and heated in a single reaction step until the hydroxyl number and/or acid number reach a desirable value. In other cases, it may be more desirable to pre-react two of the components (e.g., the aromatic dicarboxylic acid source and the $C_2$-$C_{10}$ aliphatic diol or the polycarbonate and the $C_2$-$C_{10}$ aliphatic diol) and then react in the third component (e.g., the $C_8$-$C_{24}$ aliphatic dicarboxylic acid). The reaction may be performed with or without a catalyst. Heating will usually be desirable at temperatures within the range of 80° C. to 300° C., preferably 100° C. to 270° C., or 130° C. to 260° C., or 160° C. to 240° C., to produce the polyol.

Thus, in some aspects, it may be desirable to react an aromatic dicarboxylic acid source, e.g., a thermoplastic polyester, and the $C_2$-$C_{10}$ aliphatic diol to produce a digested intermediate, which could comprise a mixture of the $C_2$-$C_{10}$ aliphatic diol, glycol(s) generated from the thermoplastic polyester, terephthalate oligomers, and other glycolysis products. For example, when PET or rPET is the thermoplastic polyester, the digested intermediate can include a mixture of $C_2$-$C_{10}$ aliphatic diol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140).

Suitable catalysts for making the polyester polyols and digested intermediates are well known (see, e.g., K. Troev et al., *J. Appl. Polym. Sci.* 90 (2003) 1148). In particular, suitable catalysts comprise titanium, zinc, antimony, germanium, zirconium, manganese, tin, or other metals. Specific examples include titanium alkoxides (e.g., tetrabutyl titanate or tetraisopropyl titanate), titanium(IV) phosphate, zirconium alkoxides, zinc acetate, lead acetate, cobalt acetate, manganese(II) acetate, antimony trioxide, germanium oxide, butyl stannoic acid, di-n-butyl-oxo-stannane, butyltin hydroxide oxide hydrate, di-n-butyltin dilaurate, or the like, and mixtures thereof. Catalysts that do not significantly promote isocyanate reaction chemistries are preferred. Catalysts comprising titanium or tin, particularly titanium alkoxides or alkyltin oxides, are especially preferred. The amount of catalyst used is typically in the range of 0.005 to 5 wt. %, preferably 0.01 to 1 wt. %, more preferably 0.02 to 0.7 wt. %, based on the total amount of polyol being prepared.

Usually, a digestion reaction is performed by heating the aromatic dicarboxylic acid source and/or polycarbonate, the diol(s), and any catalyst at least until the mixture liquefies and any particles of the aromatic dicarboxylic acid source and/or polycarbonate are no longer apparent. Reaction times range from about 30 minutes to about 16 hours, more typically 1 to 10 hours, and will depend on the reaction temperature, source and nature of the aromatic dicarboxylic acid source and/or polycarbonate, the particular diol reactant used, mixing rate, desired degree of depolymerization, and other factors that are within the skilled person's discretion.

Polyol Attributes

The semi-crystalline polyester polyols have a hydroxyl number within the range of 14 to 112 mg KOH/g, or 28 to 112 mg KOH/g, or 28 to 56 mg KOH/g. Hydroxyl number can be measured by any accepted method for such a determination, including, e.g., ASTM E-222 ("Standard Test Methods for Hydroxyl Groups Using Acetic Anhydride Acetylation").

The polyester polyols are semi-crystalline. By "semi-crystalline," we mean that the polyols have characteristics of both crystalline and amorphous polyester polyols, including a reduced degree of crystallinity compared with highly crystalline polyester polyols, and an increased degree of crystallinity compared with amorphous polyester polyols. Semi-crystalline polyester polyols can be characterized by differential scanning calorimetry (DSC) melting and crystallization properties, by x-ray diffraction analysis, and other well-known techniques. In some aspects, the semi-crystalline polyester polyols have a crystallization temperature (Tc) within the range of −20° C. to 35° C., −20° C. to 10° C., −10° C. to 30° C., or −5° C. to 25° C., as measured by differential scanning calorimetry during a heating or cooling cycle at 10° C. per minute. Any commercial differential scanning calorimeter can be used, including, for instance a PerkinElmer DSC 4000 calorimeter, a Q20 or Q2000 calorimeter from TA Instruments, or the like.

In some aspects, the polyols have average hydroxyl functionalities (i.e., the average number of —OH groups per molecule) within the range of 1.8 to 2.7, or 1.9 to 2.3, or 1.9 to 2.1, and preferably about 2.0.

The polyols preferably have low acid numbers. Urethane manufacturers will often require that a polyol have an acid number below a particular specification. Low acid numbers can be ensured by driving reactions by removal of water from the reaction mixture to the desired level of completion. Preferably, the polyols have an acid number less than 30 mg KOH/g, more preferably less than 10 mg KOH/g, and most preferably less than 5 mg KOH/g. Acid numbers can be adjusted if necessary for a particular application with an acid scavenger such as, for example, an epoxide derivative, and this treatment can be performed by the manufacturer, distributor, or end user.

An advantage of the semi-crystalline polyester polyols is their reduced reliance on petrochemical sources for raw material. Preferably, the polyols include 1 to 50 wt. %, 5 to 30 wt. %, or 5 to 25 wt. % of recycle content. By "recycle content," we mean the combined amounts of post-consumer and post-industrial recycled materials as a percentage of all of the reactants used. Recycled thermoplastic polyester (e.g., rPET), recycled polycarbonate, and recycled glycols are included in this amount. Propylene glycol, ethylene glycol, and diethylene glycol are available as recovered or recycled materials. For instance, propylene glycol is used in deicing fluids, and after use, it can be recovered, purified, and reused. In some aspects, the recycle content will come principally from the aromatic dicarboxylic acid source, polycarbonate, or combination thereof.

In some aspects, the polyols will also have bio-renewable content. By "bio-renewable content," we mean the proportion of readily renewable materials from biological sources compared with the total mass of the reactants. In some aspects, the polyester polyols will have bio-renewable contents greater than 50 wt. %, preferably greater than 65, 80, 95, or 99 wt. %. Thus, for example, a polyester polyol made from azelaic acid (from ozonolysis of oleic acid), 1,3-propanediol (available from fermentation of sugars), and recycled PET or recycled polycarbonate may have a high proportion of bio-renewable content from the azelaic acid and 1,3-propanediol.

In some aspects, the polyols will have substantial "green content." By "green content," we mean the sum of the recycle and bio-renewable contents. In some aspects, the polyester polyols will have green contents greater than 20 wt. %, preferably greater than 50 wt. %, more preferably greater than 80 wt. %, and most preferably greater than 90 wt. %.

Products from the Semi-Crystalline Polyester Polyols

The semi-crystalline polyester polyols can be used as intermediates to formulate a wide variety of thermoset or thermoplastic polymer products, including polyurethanes, acrylics, melamines, alkyds, silane polymers, and the like. For instance, the polyols can be used alone or in combination with other polyols to produce cellular, microcellular, and non-cellular materials including flexible foams, rigid foams (including polyisocyanurate foams), polyurethane dispersions, coatings (including one- or two-component polyurethanes), adhesives, sealants, and elastomers. The resulting polymers are potentially useful for automotive and transportation applications, building and construction products, marine products, packaging foam, flexible slabstock foam, carpet backing, appliance insulation, cast elastomers and moldings, footwear, biomedical devices, and other applications. As is described in more detail below, the polyols have exceptional value for production of reactive hot-melt polyurethane adhesives.

Reactive Hot-Melt Adhesives from the Semi-Crystalline Polyester Polyols

Reactive hot-melt adhesives useful herein comprise isocyanate-terminated prepolymers as their sole or principal component. Prior to curing with atmospheric moisture, the adhesives have free NCO contents from 0.5 to 8.0 wt. %, preferably 1.0 to 5.0 wt. % or 1.5 to 3.0 wt. %. The adhesives set quickly upon cooling as the prepolymer crystallizes, thereby providing good green strength. Ultimate tensile and adhesive properties are achieved as the isocyanate groups in the prepolymer react with atmospheric moisture over 1 to 7 days to provide a fully cured, thermoset adhesive. For general information about formulating reactive hot-melt adhesives, see, U.S. Pat. Nos. 7,641,968 and 6,448,193 and PCT Internat. Publ. No. WO 2014/114758, the teachings of which are incorporated herein by reference.

In some aspects, the NCO-terminated prepolymers are reaction products of the semi-crystalline polyester polyols and an excess of a polyisocyanate. Polyisocyanates suitable for use in making the prepolymers are well known; they include aromatic, aliphatic, and cycloaliphatic polyisocyanates. Examples include toluene diisocyanates (TDIs), MDIs, polymeric MDIs, naphthalene diisocyanates (NDIs), hydrogenated MDIs, trimethyl- or tetramethylhexamethylene diisocyanates (TMDIs), hexamethylene diisocyanate (HDI), isophorone diisocyanates (IPDIs), cyclohexane diisocyanates (CHDIs), xylylene diisocyanates (XDI), hydrogenated XDIs, and the like. MDI, polymeric MDI, and hexamethylene diisocyanate are preferred.

In some aspects, the reactive hot-melt adhesive may include one or more adhesion promoters. Adhesion promoters facilitate bonding among components of the adhesive and also between the reactive hot-melt adhesive and the substrate surfaces. Suitable adhesion promoters are well known in the industry. Silane compounds are a preferred class of adhesion promoters. Suitable silane adhesion promoters include, for example, N-ethylaminoisobutyl trimethoxysilane, tris(3-(trimethoxysilyl)propyl)-isocyanurate, 3-aminopropyltriethoxysilane, 3-isocyanatopropyl trimethoxysilane, 3-isocyanatopropyl triethoxysilane, 3-glycidoxypropylmethyldiethoxysilanem, and the like, and mixtures thereof. 3-Aminopropyltriethoxysilane is particularly preferred.

Catalysts helpful for accelerating curing of the prepolymer with atmospheric moisture can be included if desired. Suitable catalysts for this purpose include tin carboxylates or other compounds such as, for example, dibutyltin dilaurate, stannous octoate, or other well-known catalysts.

The reactive hot-melt adhesive can be prepared by any suitable technique. One suitable method is provided further below. In general, the semi-crystalline polyester polyol is typically heated under inert conditions to melt the polyol and/or reduce its viscosity. The desired amount of polyisocyanate (i.e., an amount effective to give an isocyanate-terminated prepolymer having a free NCO content of 1.0 to 5.0 wt. %) is combined with the polyol, and the reaction proceeds to give the prepolymer. External heating or cooling is used to control the reaction temperature within the desired range, and the free NCO content is monitored by any convenient means, typically by titration. The product is then usually combined with any adhesion promoters, catalysts, or other additives, and is stored under inert conditions until it is ready to use.

Composite Structures

The invention includes composite structures that incorporate the cured hot-melt adhesives. In some aspects, the composite structures comprise a wood, paper, glass, ceramic, plastic, or metal substrate. In the composite structures, the cured adhesive is bonded to at least one surface of the substrate. In some aspects, the substrate is polyolefin (e.g., polyethylene, polypropylene, or the like), aluminum, polycarbonate, or polyvinylchloride.

Regarding the composite structures, "green strength" is an indication of the strength of a bond prior to substantial moisture curing of the reactive hot-melt adhesive. Some or all of the initial strength properties may be attributed to crystallization of the polyester polyol that results from cooling after application. Green strength can be quantified in terms of amount of stress needed to disrupt the adhesive bond in the standard lap shear strength test (ASTM D1002-10) as measured one hour after forming the bond. Moisture curing often requires at least 24 hours to complete, and may require as long as 7 days. Consequently, measurements of peak shear stress at these intervals after forming the bond can provide a measure of how quickly and how well a particular reactive hot-melt adhesive accomplishes a moisture cure with a given substrate.

As described in the examples below, "adhesive failure" (AF) indicates an adhesive bond that ruptures leaving most or all of the adhesive on one of the substrate surfaces. This is considered to be the weakest type of bond. "Cohesive failure" (CF) indicates a rupture of the adhesive wherein adhesive remains bonded to both substrate halves. This is considered good adhesion, but the mechanical performance of the adhesive itself has room for improvement. "Substrate failure" (SF) refers to samples in which the bond between substrate halves remains intact throughout the test, and the pulled sample reaches full extension with or without breaking. This is considered to be the best kind of bonding.

The following examples merely illustrate the invention; the skilled person will recognize many variations that are within the spirit of the invention and scope of the claims.

Hydroxyl numbers and acid numbers are determined by standard methods (ASTM E-222 and ASTM D3339, respectively). Hydroxyl value (OHV)=hydroxyl number minus acid number. Free NCO content of the prepolymers is determined by titration using excess di-n-butylamine (0.2 N) and back-titration with standard hydrochloric acid according to ASTM D-1638-74.

EXAMPLE 1

Preparation of a Semi-Crystalline Polyester Polyol
(5 wt. % PET)

A 2-L reactor equipped with an overhead mixer, water condenser, short-path distillation head, heating mantle, thermocouple, and nitrogen inlet is charged with recycled polyethylene terephthalate (rPET) pellets (75.0 g, 5.0 wt. %), 1,3-propanediol (427.5 g, 28.5 wt. %), and butyltin hydroxide oxide hydrate (1.50 g, 0.10 wt. %). The reaction is performed at 200° C. for 4 h until all of the rPET digests into solution. The heating mantle is removed, and the reactor contents are allowed to cool to 100° C. Emerox® 1175 azelaic acid (996.0 g, 66.4 wt. %, product of Emery Oleochemicals) is added, a 10" Vigreux column replaces the condenser, and the reaction temperature is increased to 165° C. Water of reaction is removed by distillation. After 2.5 h, the temperature is increased to 200° C., and the reaction continues until the acid value of the product is <2.0 mg KOH/g. The polyester polyol product is cooled to 130° C. and transferred to a jar. The polyol has hydroxyl value=18.7 mg KOH/g.

EXAMPLE 2

Preparation of a Semi-Crystalline Polyester Polyol
(10 wt. % PET)

The procedure of Example 1 is followed using recycled polyethylene terephthalate (150.0 g, 10.0 wt. %), 1,3-propanediol (412.5 g, 27.5 wt. %), azelaic acid (936.0 g, 62.4 wt. %), and butyltin hydroxide oxide hydrate (1.50 g, 0.10 wt. %). The polyol has hydroxyl value=18.4 mg KOH/g.

EXAMPLE 3

Preparation of a Semi-Crystalline Polyester Polyol
(15 wt. % PET)

The procedure of Example 1 is followed using recycled polyethylene terephthalate (225.0 g, 15.0 wt. %), 1,3-propanediol (390.0 g, 26.0 wt. %), azelaic acid (883.5 g, 58.9 wt. %), and butyltin hydroxide oxide hydrate (1.50 g, 0.10 wt. %). The polyol has hydroxyl value=19.6 mg KOH/g.

COMPARATIVE EXAMPLE 4

Preparation of an Aliphatic Polyester Polyol

A 2-L reactor equipped with an overhead mixer, 10" Vigreux column, short-path distillation head, heating mantle, thermocouple, and nitrogen inlet is charged with Emerox® 1175 azelaic acid (597.5 g, 70.3 wt. %), 1,3-propanediol (251.7 g, 29.6 wt. %), and butyltin hydroxide oxide hydrate (0.85 g, 0.10 wt. %). The mixture is heated to 165° C. and water of reaction is removed by distillation. After 2.5 h, the temperature is increased to 200° C., and the reaction continues until the acid value of the product is <2.0 mg KOH/g. The polyester polyol product is cooled to 130° C. and transferred to a jar. The polyol has hydroxyl value=29.8 mg KOH/g.

EXAMPLE 5

Preparation of a Semi-crystalline Polyester Polyol
(5 wt. % Polycarbonate)

A 500-mL reactor equipped with an overhead mixer, water condenser, short-path distillation head, heating mantle, thermocouple, and nitrogen inlet is charged with recycled bisphenol A polycarbonate (PC) pellets (22.5 g, 5.0 wt. %), 1,3-propanediol (127.2 g, 28.3 wt. %), and butyltin hydroxide oxide hydrate (0.45 g, 0.10 wt. %). The reaction is performed at 200° C. for 4 h until all of the polycarbonate digests into solution. The heating mantle is removed, and the mixture is allowed to cool to 100° C. Azelaic acid (299.9 g, 66.6 wt. %) is added, a 10" Vigreux column replaces the condenser, and the reaction temperature is increased to 165° C. Water of reaction is removed by distillation. After 2.5 h, the temperature is increased to 200° C., and the reaction continues until the acid value of the product is <2.0 mg KOH/g. The polyester polyol product is cooled to 130° C. and transferred to a jar. The polyol has hydroxyl value=28.2 mg KOH/g.

EXAMPLE 6

Preparation of a Semi-crystalline Polyester Polyol
(10 wt. % Polycarbonate)

The procedure of Example 5 is followed using recycled bisphenol A polycarbonate (45.0 g, 10.0 wt. %), 1,3-propanediol (120.6 g, 26.8 wt. %), and azelaic acid (284.0 g, 63.1 wt. %). The polyol has hydroxyl value=47.1 mg KOH/g.

EXAMPLE 7

Preparation of a Semi-crystalline Polyester Polyol
(15 wt. % Polycarbonate)

The procedure of Example 5 is followed using recycled bisphenol A polycarbonate (67.5 g, 15.0 wt. %), 1,3-propanediol (114.3 g, 25.4 wt. %), and azelaic acid (267.8 g, 59.5 wt. %). The polyol has hydroxyl value=58.6 mg KOH/g.

COMPARATIVE EXAMPLE 8

Preparation of an Aliphatic Polyester Polyol

The procedure of Comparative Example 4 is repeated with azelaic acid (597.5 g, 70.3 wt. %), 1,3-propanediol (251.7 g, 29.6 wt. %), and butyltin hydroxide oxide hydrate (0.85 g, 0.10 wt. %). The polyol has hydroxyl value=18.9 mg KOH/g.

Preparation of Reactive Hot-Melt Adhesive

A warm reaction flask equipped with mechanical stirring, thermocouple, heating mantle, and nitrogen inlet is charged with a polyester polyol, and the polyol is heated to 80° C. under a flow of nitrogen. Solid polyols are liquefied prior to starting the stirrer. The polyol is allowed to stir for 0.5 h at 80° C. Benzoyl peroxide (2-3 drops) is added, and mixing continues for 5 min. The amount of MDI powder needed to achieve a targeted free NCO content in the prepolymer is added to the reactor in one portion. External heating is removed, good stirring commences, and a water bath is used to control the ensuing exothermic reaction, keeping the reaction mixture at or below about 90° C. After the exotherm subsides, and the pot temperature drops to about 75° C., heat is reapplied to bring the reactor contents to 115° C. Heating at 115° C. continues for 1 h, and a sample is collected to measure free NCO content by titration. 3-Aminopropyltriethoxysilane (1.0 wt. %) and dibutyltin dilaurate (500 ppm) are added, and the resulting isocyanate-terminated prepolymer is stirred for 5 to 10 minutes, then poured from the reactor into an aluminum storage container, which is capped with nitrogen prior to sealing. Table 1 shows the target and actual NCO content of the prepolymers.

TABLE 1

MDI Prepolymers

| Polyol | from Ex. # | OH value (mg KOH/g) | target wt. % NCO | actual wt. % NCO |
|---|---|---|---|---|
| from Semi-Crystalline Polyester Polyols based on Recycled PET | | | | |
| 5% PET | 1 | 18.7 | 2.50 | 2.09 |
| 10% PET | 2 | 18.4 | 3.50 | 2.03 |
| 15% PET | 3 | 19.6 | 3.50 | 1.74 |
| 0% PET | C4 | 29.8 | 2.50 | 1.78 |
| from Semi-Crystalline Polyester Polyols based on Recycled Bisphenol A Polycarbonate | | | | |
| 5% PC | 5 | 28.2 | 3.00 | 1.20 |
| 10% PC | 6 | 47.1 | 3.00 | 1.65 |
| 15% PC | 7 | 58.6 | 3.00 | 1.48 |
| 0% PC | C8 | 18.9 | 2.50 | 1.27 |

Test Procedure for Reactive Hot-Melt Adhesives

The ability of the NCO-terminated prepolymers to bond polyvinyl chloride, polyethylene, polycarbonate, or aluminum substrates is evaluated.

Enough test substrate panels are obtained to allow testing in triplicate for each of three different cure times (1 h, 24 h, 7 days). Panels are cleaned with isopropyl alcohol, and a 1"×1" square of polyethylene is glued with hot-melt adhesive to one end of each test panel. The affixed polyethylene squares are used to dampen pressure from clips used to hold two halves of a specimen together during cure.

Aluminum containers of prepolymers to be tested are equilibrated in a 120° C. oven, then removed and kept hot on a 170° C. hotplate. The area above the heated sample is kept under a nitrogen blanket and a suitable ventilation hose. A sample of the hot prepolymer is applied evenly using a wooden applicator to a 1"×1" area to the sample on the opposite side of the polyethylene square. Another substrate piece is pressed together with the coated sample, and the halves are clipped together. This process is repeated eight times for each the four substrate types. All 36 samples are conditioned at 25° C. at 50% relative humidity for curing.

After 1 hour of conditioning (i.e., an incompletely cured sample), three specimens of each type are removed from the conditioning chamber and subjected to lap shear testing according to ASTM D1002. Vertically suspended test specimens are pulled apart using an MTS tensile tester at 12 in/min using a 30 kN load cell and an extension endpoint of 6 in. A control sample utilizes 3M Company's EZ250150 adhesive to bond the substrates. Performance after only 1 hour of curing is an indication of a bond's "green strength."

The process is repeated with three specimens of each substrate type after 1 day of conditioning at 25° C. at 50% relative humidity (i.e., a well-cured sample), and again after 7 days of conditioning (i.e., a fully cured sample). Lap shear strength (peak stress in pounds per square inch) is recorded for each sample, as well as the mode of failure observed, and the average value from the three samples is reported in Tables 2 and 3 below.

Results from the testing of adhesives from semi-crystalline polyester polyols comprising 5-15 wt. % of rPET appear in Table 2. Results from the testing of adhesives from semi-crystalline polyester polyols comprising 5-15 wt. % of bisphenol A polycarbonate appear in Table 3.

As indicated earlier, "adhesive failure" (AF) indicates an adhesive bond that ruptures leaving most or all of the adhesive on one of the substrate surfaces. "Cohesive failure" (CF) indicates a rupture of the adhesive wherein adhesive remains bonded to both substrate halves. "Substrate failure" (SF) refers to samples in which the bond between substrate halves remains intact throughout the test, and the pulled sample reaches full extension with or without breaking.

TABLE 2

Reactive Hot-Melt Adhesives from Semi-Crystalline Polyester Polyols (Recycled PET)

Substrate: Polyethylene

| | 1 h (psi) | fail mode | 24 h (psi) | fail mode | 7 day (psi) | fail mode |
|---|---|---|---|---|---|---|
| 0% PET | 19 | AF | 13 | AF | 18 | AF |
| 5% PET | 48 | CF | 19 | AF | 18 | AF |
| 10% PET | 28 | CF | 85 | CF | 72 | AF |
| 15% PET | 38 | CF | 76 | CF | 75 | CF |
| control | 12 | AF | 12 | AF | 19 | AF |

Substrate: Aluminum

| | 1 h (psi) | fail mode | 24 h (psi) | fail mode | 7 day (psi) | fail mode |
|---|---|---|---|---|---|---|
| 0% PET | 380 | CF | 520 | AF, CF | 780 | AF, CF |
| 5% PET | 80 | CF | 481 | CF | 596 | CF |
| 10% PET | 21 | CF | 272 | CF | 514 | CF |
| 15% PET | 31 | CF | 81 | CF | 269 | CF |
| control | 100 | AF | 240 | AF | 390 | AF, CF |

Substrate: Polycarbonate

| | 1 h (psi) | fail mode | 24 h (psi) | fail mode | 7 day (psi) | fail mode |
|---|---|---|---|---|---|---|
| 0% PET | 520 | CF, AF | 880 | AF, CF | 870 | AF |
| 5% PET | 106 | CF | 790 | CF | 1002 | CF |
| 10% PET | 74 | CF | 760 | CF | 737 | CF |
| 15% PET | 38 | CF | 385 | CF | 441 | CF |
| control | 280 | CF | 1100 | CF | 1170 | SF |

Substrate: Polyvinylchloride

| | 1 h (psi) | fail mode | 24 h (psi) | fail mode | 7 day (psi) | fail mode |
|---|---|---|---|---|---|---|
| 0% PET | 350 | AF | 960 | CF | 1210 | SF |
| 5% PET | 112 | CF | 876 | CF | 1099 | SF, CF |
| 10% PET | 48 | CF | 840 | SF, CF | 870 | SF, CF |

TABLE 2-continued

Reactive Hot-Melt Adhesives from Semi-Crystalline Polyester Polyols (Recycled PET)

| 15% PET | 35  | CF     | 528 | CF | 1085 | SF, CF |
|---------|-----|--------|-----|----|------|--------|
| control | 250 | CF, AF | 580 | CF | 1180 | SF, CF |

Fail modes:
AF = adhesive failure;
CF = cohesive failure;
SF = substrate failure
PC = recycled bisphenol A polycarbonate;
PET = recycled polyethylene terephthalate control = EZ250150 adhesive, product of 3M Company As shown in Table 2, reactive hot-melt adhesives from semi-crystalline polyester polyols that incorporate 5-15 wt. % of recycled polyethylene terephthalate generally provide improved adhesion to polyethylene substrates compared with similar adhesives made from an aliphatic polyester polyol (0% PET). The improvement in green strength is substantial, with each of the rPET samples exhibiting cohesive failure (CF) after the first hour. The 24-hour and 7-day results also demonstrate a three- or four-fold boost in peak stress at the 10-15 wt. % PET levels.

With the aluminum substrate, adhesives from the semi-crystalline polyester polyols based on 5-15 wt. % of recycled PET consistently exhibit cohesive failure, even after only a 1-hour moisture cure. Overall, the adhesive from the aliphatic polyester polyol achieves a higher peak stress value, but inclusion of 5-15 wt. % of PET improves the failure mode results.

Results with the polycarbonate substrate are similar to those seen with the aluminum substrate. Thus, inclusion of recycled PET generally provides adhesives that exhibit cohesive failure.

With polyvinylchloride as the substrate, adhesives from the semi-crystalline polyester polyols based on 5-15 wt. % of recycled PET exhibit only cohesive failure after one hour. Overall, with the PVC substrate, performance of adhesives from the PET-based polyols rivals that of the adhesive from the aliphatic polyester polyol.

In sum, the semi-crystalline polyester polyol delivers improved overall performance in reactive hot-melt polyurethane adhesives, especially with the nonpolar polyethylene substrate.

TABLE 3

Reactive Hot-Melt Adhesives from Semi-Crystalline Polyester Polyols (Recycled Bisphenol A Polycarbonate)

Substrate: Polyethylene

|         | 1 h (psi) | fail mode | 24 h (psi) | fail mode | 7 day (psi) | fail mode |
|---------|-----------|-----------|------------|-----------|-------------|-----------|
| 0% PC   | 18        | N/A       | 8          | AF        | 23          | AF        |
| 5% PC   | 39        | AF        | 27         | AF        | 24          | AF        |
| 10% PC  | 49        | N/A       | 26         | AF        | 25          | AF        |
| 15% PC  | 45        | N/A       | 36         | AF        | 36          | AF        |
| control | 12        | AF        | 13         | AF        | 20          | AF        |

Substrate: Aluminum

|         | 1 h (psi) | fail mode | 24 h (psi) | fail mode | 7 day (psi) | fail mode |
|---------|-----------|-----------|------------|-----------|-------------|-----------|
| 0% PC   | 280       | CF        | 340        | CF        | 500         | AF        |
| 5% PC   | 145       | AF        | 279        | AF        | 394         | AF        |
| 10% PC  | 48        | N/A       | 626        | CF        | 793         | AF        |
| 15% PC  | 34        | N/A       | 569        | CF        | 713         | AF        |
| control | 105       | AF        | 240        | AF        | 390         | AF, CF    |

Substrate: Polycarbonate

|         | 1 h (psi) | fail mode | 24 h (psi) | fail mode | 7 day (psi) | fail mode |
|---------|-----------|-----------|------------|-----------|-------------|-----------|
| 0% PC   | 430       | CF        | 1000       | CF        | 970         | AF        |
| 5% PC   | 411       | CF        | 543        | AF        | 857         | AF        |
| 10% PC  | 51        | N/A       | 808        | AF        | 965         | AF        |
| 15% PC  | 50        | CF        | 523        | CF        | 592         | AF        |
| control | 280       | CF        | 1100       | CF        | 1170        | SF        |

Substrate: Polyvinylchloride

|         | 1 h (psi) | fail mode | 24 h (psi) | fail mode | 7 day (psi) | fail mode |
|---------|-----------|-----------|------------|-----------|-------------|-----------|
| 0% PC   | 340       | CF        | 910        | CF        | 940         | AF        |
| 5% PC   | 389       | CF        | 1062       | AF, CF    | 1053        | AF, SF    |
| 10% PC  | 43        | N/A       | 1149       | SF        | 1146        | SF        |
| 15% PC  | 41        | N/A       | 1046       | SF        | 976         | SF        |
| control | 250       | CF, AF    | 580        | CF        | 1180        | CF, SF    |

Fail modes:
AF = adhesive failure;
CF = cohesive failure;
SF = substrate failure
PC = recycled bisphenol A polycarbonate;
PET = recycled polyethylene terephthalate control = EZ250150 adhesive, product of 3M Company As shown in Table 3, for the polyethylene substrate, a reactive hot-melt adhesive prepared from a semi-crystalline polyester polyol comprising 5-15 wt. % of bisphenol A polycarbonate provides a minor improvement in peak stress compared with the adhesive prepared from the aliphatic polyester polyol alone.

With the aluminum substrate, peak stress is noticeably increased for the hot-melt adhesive prepared from the semi-crystalline polyester polyol comprising 10-15 wt. % polycarbonate when compared with the adhesive prepared from the aliphatic polyester polyol alone.

Interestingly, no significant improvement in peak stress or failure mode is seen in the adhesive made from the semi-crystalline polyester polyol comprising polycarbonate when the substrate is polycarbonate.

With the polyvinylchloride substrate, cohesive or substrate failure is achieved in the 24-hour or 7-day results when the adhesive is prepared from the semi-crystalline polyester polyol comprising 5-15 wt. % of bisphenol A polycarbonate.

The preceding examples are meant only as illustrations; the following claims define the inventive subject matter.

We claim:

1. A semi-crystalline polyester polyol comprising recurring units of:
   (a) a $C_2$-$C_{10}$ aliphatic diol;
   (b) a $C_8$-$C_{24}$ aliphatic dicarboxylic acid; and
   (c) (i) an aromatic dicarboxylic acid source consisting of recycled polyethylene terephthalate,
       (ii) bisphenol A polycarbonate, or
       (iii) a combination of (i) and (ii);
   wherein 5 to 15 wt. % of the recycled polyethylene terephthalate or the bisphenol A polycarbonate is used based on the combined amounts of components (b) and (c);

wherein the polyol has a hydroxyl number within the range of 14 to 112 mg KOH/g;

and wherein the polyol has a crystallization temperature within the range of −20° C. to 35° C. as measured by differential scanning calorimetry during a heating or cooling cycle at 10° C. per minute.

2. The polyol of claim 1 having a crystallization temperature within the range of −20° C. to 10° C.

3. The polyol of claim 1 wherein the aliphatic diol is selected from the group consisting of ethylene glycol, propylene glycol, 1,3-propanediol, 1,2-butanediol, 1,3-butanediol, 1,4-butanediol, 2-methyl-1,3-propanediol, neopentyl glycol, 1,5-pentanediol, 2,2,4,4-tetramethyl-1,3-cyclobutanediol, 3-methyl-1,5-pentanediol, 1,4-cyclohexanedimethanol, 1,3-cyclohexanedimethanol, diethylene glycol, dipropylene glycol, triethylene glycol, 1,6-hexanediol, 1,8-octanediol, tripropylene glycol, tetraethylene glycol and mixtures thereof.

4. The polyol of claim 1 wherein the aliphatic diol is selected from the group consisting of 1,3-propanediol, 1,4-butanediol, and mixtures thereof.

5. The polyol of claim 1 wherein the aliphatic dicarboxylic acid is selected from the group consisting of suberic acid, azelaic acid, sebacic acid, undecanedioic acid, dodecanedioic acid, tridecanedioic acid, tetradecanedioic acid, pentadecanedioic acid, hexadecanedioic acid, septadecanedioic acid, octadecanedioic acid, and mixtures thereof.

6. The polyol of claim 1 wherein the aliphatic dicarboxylic acid comprises at least 60 wt. % of azelaic acid.

7. The polyol of claim 1 wherein the aliphatic dicarboxylic acid is selected from the group consisting of azelaic acid, octadecanoic acid, and mixtures thereof, and the aliphatic diol is selected from the group consisting of 1,3-propanediol, 1,4-butanediol, and mixtures thereof.

8. The polyol of claim 1 having an average hydroxyl functionality within the range of 1.8 to 2.7.

9. A reactive hot-melt adhesive comprising a reaction product of:
(a) a polyisocyanate; and
(b) the semi-crystalline polyester polyol of claim 1;
wherein prior to curing, the adhesive has a free NCO content within the range of 0.5 to 8.0 wt. %.

10. The adhesive of claim 9 wherein the polyisocyanate is selected from the group consisting of MDI, polymeric MDIs, and hexamethylene diisocyanate.

11. The adhesive of claim 9 wherein the polyisocyanate is MDI.

12. The adhesive of claim 9 wherein prior to curing, the adhesive has a free NCO content within the range of 1.0 to 5.0 wt. %.

13. The adhesive of claim 9 further comprising an adhesion promoter selected from the group consisting of N-ethylaminoisobutyl trimethoxysilane, tris(3-(trimethoxysilyl)propyl)isocyanurate, 3-aminopropyltriethoxysilane, 3-isocyanato-propyl trimethoxysilane, 3-isocyanatopropyl triethoxysilane, and 3-glycidoxypropyl-methyldiethoxysilane.

14. The adhesive of claim 9 wherein the adhesion promoter is 3-aminopropyltriethoxysilane.

15. A composite structure comprising a wood, paper, glass, ceramic, plastic, or metal substrate and a cured hot-melt adhesive of claim 9 bonded to at least one surface of the substrate.

16. The composite structure of claim 15 wherein the substrate is selected from the group consisting of polyolefin, aluminum, polycarbonate, and polyvinylchloride.

17. A semi-crystalline polyester polyol comprising recurring units of:
(a) a $C_2$-$C_{10}$ aliphatic diol;
(b) a $C_8$-$C_{24}$ aliphatic dicarboxylic acid; and
(c) bisphenol A polycarbonate;
wherein 1 to 20 wt. % of the bisphenol A polycarbonate is used based on the combined amounts of components (b) and (c); and
wherein the polyol has a hydroxyl number within the range of 14 to 112 mg KOH/g.

18. The polyol of claim 17 having a crystallization temperature within the range of −20° C. to 35° C. as measured by differential scanning calorimetry during a heating or cooling cycle at 10° C. per minute.

19. The polyol of claim 17 having a crystallization temperature within the range of −20° C. to 10° C.

20. A reactive hot-melt adhesive comprising a reaction product of:
(a) a polyisocyanate; and
(b) the semi-crystalline polyester polyol of claim 17;
wherein prior to curing, the adhesive has a free NCO content within the range of 0.5 to 8.0 wt. %.

* * * * *